Jan. 31, 1956

W. D. FOSTER ET AL
LOCK FOR FILM CONTAINING MAGAZINES
AND FILM HANDLING APPARATUS

Original Filed Feb. 12, 1948

INVENTORS
Warren Dunlan Foster
BY Olivia Whitwell Wilson
Warren Dunlan Foster
Attorney

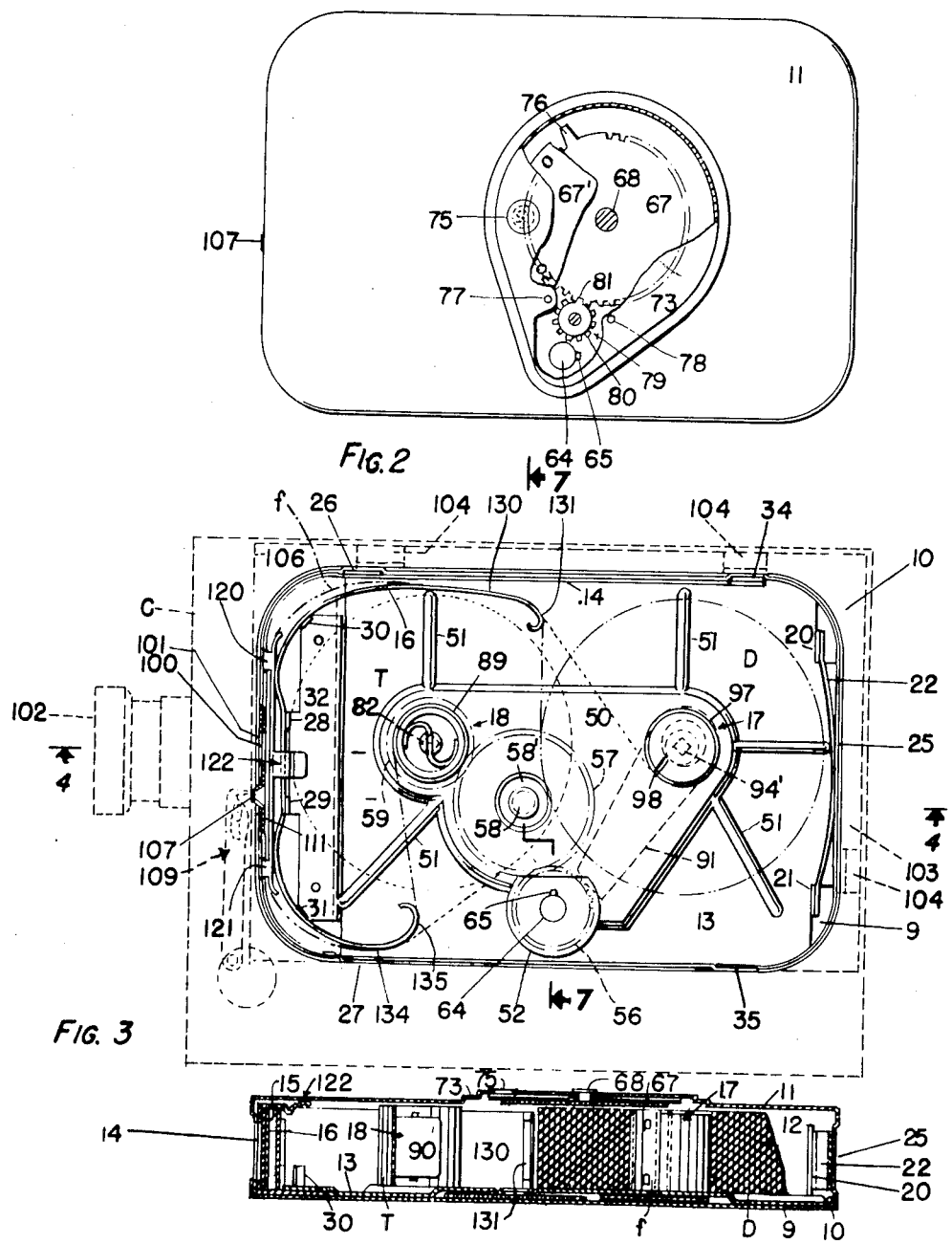

Jan. 31, 1956

W. D. FOSTER ET AL 2,733,021

LOCK FOR FILM CONTAINING MAGAZINES
AND FILM HANDLING APPARATUS

Original Filed Feb. 12, 1948

W. D. FOSTER ET AL
LOCK FOR FILM CONTAINING MAGAZINES
AND FILM HANDLING APPARATUS 2,733,021

Original Filed Feb. 12, 1948

INVENTORS
Warren Dunham Foster
BY Oliver Whitwell Wilson
Warren Dunham Foster
Attorney

United States Patent Office 2,733,021
Patented Jan. 31, 1956

2,733,021

LOCK FOR FILM CONTAINING MAGAZINES AND FILM HANDLING APPARATUS

Warren Dunham Foster, Eustis, Fla., and Oliver Whitwell Wilson, Arlington County, Va., assignors, by direct and mesne assignments, to Foster and Foster, Ridgewood, N. J., a copartnership Original application February 12, 1948, Serial No. 7,926, now Patent No. 2,560,564, dated July 17, 1951. Divided and this application July 13, 1951, Serial No. 236,592

20 Claims. (Cl. 242—71)

Our invention may be applied to motion picture and other film handling and photographic apparatus for use by amateurs but its utility is not so limited. We are illustrating our invention in connection with a magazine containing a film for use in a camera but in many of its phases our invention is applicable to any device for the projection or exposure or printing of pictures or of other images. Our invention is exemplified herein as applied to improved magazines of the type described and claimed in our parent application Serial Number 7,926, filed February 12, 1948, and upon July 17, 1951, matured as Patent Number 2,560,564, of which this application is a division. It is to be understood, however, that our invention is not limited to this type of magazine or in fact to any magazine since it is applicable to film handling apparatus making use of open reels.

One chief purpose of a film magazine is to make the threading of an apparatus with which the film is used simple, safe and quick and without requirement of skill. Also such a camera magazine must be so constructed that it can be easily, quickly and cheaply loaded with a a film by a manufacturer before it is sent out and the film after exposure removed therefrom for processing. Also the film must be fed without danger of jamming or other difficulty and must be closely maintained in all planes in the exact wanted position so that the images impressed thereupon or projected therefrom will be accurate and pleasing. An object of our invention is to contribute to the accomplishment of these results.

A common cause of jamming, failure to maintain a film in the proper plane at the moment of translation and other serious difficulties is unwanted unwinding of the film. The natural elasticity of a film and other factors, such, for example, as jolts and jars in transportation and use, result in unwanted unwinding of loosening of its delivery and take-up masses which may cause the film to block an exposure or projection channel between said masses so that when an attempt is made to feed the film either it does not move or it breaks. If these masses are not kept tightly rolled even if feeding can be carried out without immediately noticeable interference the pictures are likely to be unsteady. Even though a film may be fed longitudinally it may waver laterally at a point of translation. Among the chief objects of this invention, therefore, is the provision of a simple, novel and effective means to lock a delivery mass against movement in either direction and a take-up mass especially against unwinding movement.

Without proper locking means a system of compensation cannot operate properly or at all. A film at the point of translation of an image moves intermittently (except in the little used system of optical rectification) while the delivery and take-up masses move continuously. To compensate for this kinetic difference one or two methods is commonly used.

In film-containing magazines in general use one system depends upon the automatic establishment and maintenance of a condition of controlled tension, as first presented in the Bundick and Proctor Patent Number 1,944,022, and further developed for use in magazines by the senior applicant herein as in such United States Patents as Number 1,975,782 and by Kurt Morsbach et al. in Patents Numbers 2,159,998 and 2,175,538, and others of the same groups. Alternatively this compensation may be secured by the Thornton system which relies upon the previous establishment by hand of two unsupported loops of slack film and their maintenance, when all goes well, by continuously rotating sprockets. This system is illustrated by a patent of John Edward Thornton, British 164,467, accepted June 6, 1921, or his United States Patent Number 1,716,990 or such patents as that to Wittel 2,043,914. Although the necessity of maintaining the film masses against unwanted movement preliminary or subsequent to a regular feeding movement is necessary and critical in magazines of the Thornton type with their unsupported loops of slack film it is highly desirable even in the simpler type making use of the tension control system of feeding. In this application our invention is illustrated as applied to magazines of the tension control type but it is equally and in some respects more applicable to magazines of the Thornton type. An important object of our invention, therefore, is to lock a film, particularly if employed within a magazine, so that its unwanted movement will not interfere with the operation of a compensating system.

According to one preferred embodiment hereof we mount our locking mechanism or the operable parts thereof upon a chassis plate for bodily movement therewith and operative movement relatively thereto. As described and claimed in our said co-pending parent patent, a film and other operative and static portions of our magazine including those which support, guide, move and position the film and those which condition such movement and record its extent are also mounted upon this plate. Magazines which employ our novel chassis plate have particular need of suitable locking means since when an exposed film is to be removed and a new film substituted a worker removes the entire chassis plate. While it is outside of the chassis plate it is particularly necessary that the operable parts be locked against movement. Claims to locking means in combination with the chassis plate will be found in said parent application and those to locking means irrespective of a chassis plate herewithin.

Another related object hereof is locking a footage recording device or meter except when a film is being fed. It is important that an indication of the length of film which has been projected or exposed or remains for projection or exposure be visible by a user of a film handling apparatus, and particularly of a magazine. Unwanted unwinding of the film, however, will register upon such a meter as well as causing the above noted difficulties in feeding. It is therefore particularly important that whenever a film is not being operatively moved such a recording device be positively locked so that it does not present incorrect information. To accomplish this necessary result is a principal object of this invention.

An important basic object of this invention, therefore, is to provide a positive lock for blocking the winding or unwinding of a mass of film and of a footage recording device except when the film is being driven by power of the apparatus. Another object is to make impossible the winding or unwinding of a film housed within a magazine except when a container therefore is in driven relation with a driving element of a film handling apparatus. A related object is to provide such mechanisms in simple, inexpensive and positive forms.

The objects of this invention will be clear from the above generalized portion of this specification, the detailed description which follows, the subjoined claims and the accompanying drawings. Other objects, advantages and characteristics also will be so evident. Although we are showing only preferred forms of our invention for purposes of illustration it will be understood that changes can readily be made without departing from the scope of our broader claims or the spirit of our invention.

In the drawings:

Figure 2 is a top plan view of the magazine of Figure 1, with its cover partly broken away to show a preferred form of meter.

Figure 3 is a top plan view of the magazine of Figure 2, with its cover removed, in position in a magazine-receiving compartment of a camera.

Figure 4 is a section on line 4—4 of Figure 3.

Figure 9:
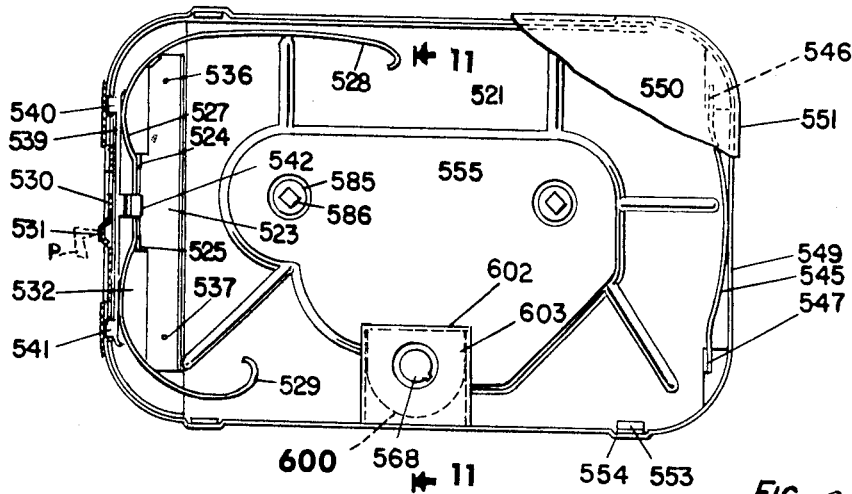
Figures 9, 10 and 11 show an important variation of our invention wherein its characteristic operating devices are mounted upon a wall of an outer protective container of a magazine instead of a chassis plate.

Figure 9 is a top plan view generally corresponding to Figure 3. It shows a chassis plate mounted upon a bottom plate of an outer container the cover of which has been removed. Film-guiding and film-tensioning members are mounted upon this plate while film moving members and our lock are mounted upon the bottom plate. For clarity gears and other members which appear below the chassis plate are not shown in dotted line.

Figure 10:
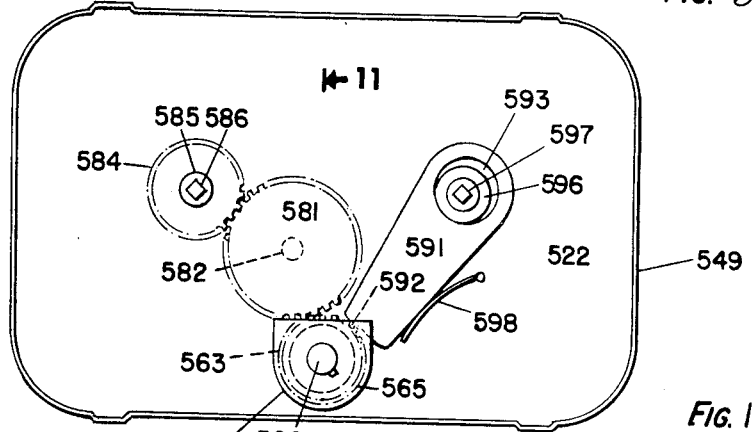

Figure 10 is a top plan view of this embodiment of our invention showing a bottom plate or wall alone.

Figure 11:
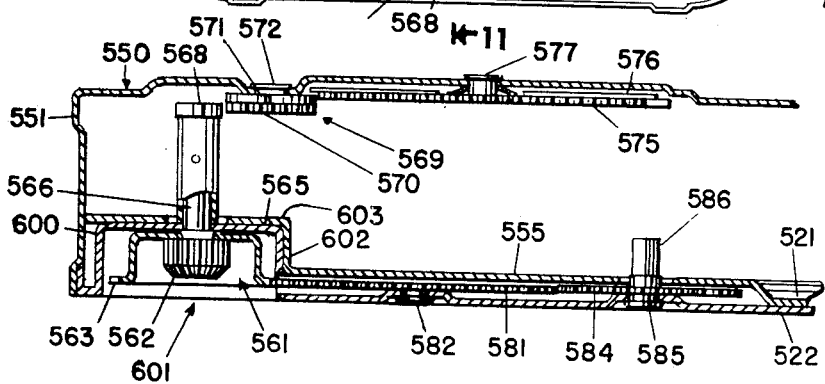

Figure 11 is an enlarged section taken on the lines 11—11 of Figures 9 and 10.

For convenience in this specification and in the subjoined claims we are using the word "front" as applied to that portion of a magazine or other structure which is relatively adjacent a lens when the magazine is within a film-handling apparatus and "rear" and the like to designate those portions relatively distant therefrom. We use the word "bottom" to indicate the part of the magazine which supports the contents (or is adjacent a chassis plate which does so) and "lower" and those related thereto to designate those portions of the magazine relatively adjacent the bottom. Such words as "top" and "upper" indicate the opposite portion. This terminology follows the drawings. As a magazine is position in common types of film-handling apparatus, the "bottom" and "top" of the magazine in reality form the sides since they are held in a vertical position. As is common in the use of such words in relation to containers the upper or cover part is that which over hangs. "Longitudinal" as applied to a path for the film indicates one coincidental with or closely adjacent the longitudinal axis of the film as it is being fed and "lateral" and words related thereto are used to mean a plane or objects falling therein normal to such longitudinal path and including the optical axis of the film at its point of translation. Other similar words and antonyms are used with similar or opposite meanings respectively.

The invention which is claimed hereby cannot be fully understood and the best means and mode of operation thereof comprehended without a description of a container within which we are illustrating it as being used, supporting members for the critical operative parts, delivery and take-up supports and a path through which the film is fed as well as means for so feeding it and a device for recording the amount of film so fed with all of which our locking mechanism directly cooperates to produce a unitary result.

An outer protective container generally rectangular in cross section is composed essentially of a bottom housing 9 having low side or edge walls 10 (or rims or flanges), a top or cover housing 11 having a relatively deep depending side wall 12, and a chassis member or plate 13 which is disposed between said housings and is completely encompassed and supported thereby. Thus the narrower side walls (or side walls and flanges) maintain the broader top and bottom walls in spaced parallelism. The chassis plate is disposed adjacent the bottom of the magazine and may be only slightly less in cross section. In the form of our invention first described all operative parts of the magazine including our locking mechanism are supported upon this chassis, except that the dial and immediately associated parts of the meter are supported on the casing. Among the members so supported are a fixed apertured gate plate generally indicated as 14, a resiliently movable presser member 15 to hold the film thereagainst, a multi-purposed curved resilient member generally indicated as 16, which serves both as a compensating device and to give resilience to the presser member, a delivery support generally indicated as 17, and a take-up support or hub generally indicated as 18.

Chassis plate 13 consists essentially of a single stiff, relatively heavy stamping or the like embodying various supporting and positioning lugs and other formations. These formations include two rear posts 20 and 21 to which a spring 22 is attached. This spring presses firmly against a rear wall 25 of the top housing 11 thus tending to force the chassis plate and all the parts supported thereby forwardly or to the left as seen in the drawings. To assemble the magazine a worker merely slips the spring and the chassis into place and the assembly is complete. Alternative constructions are shown in our parent patent.

Figure 1:
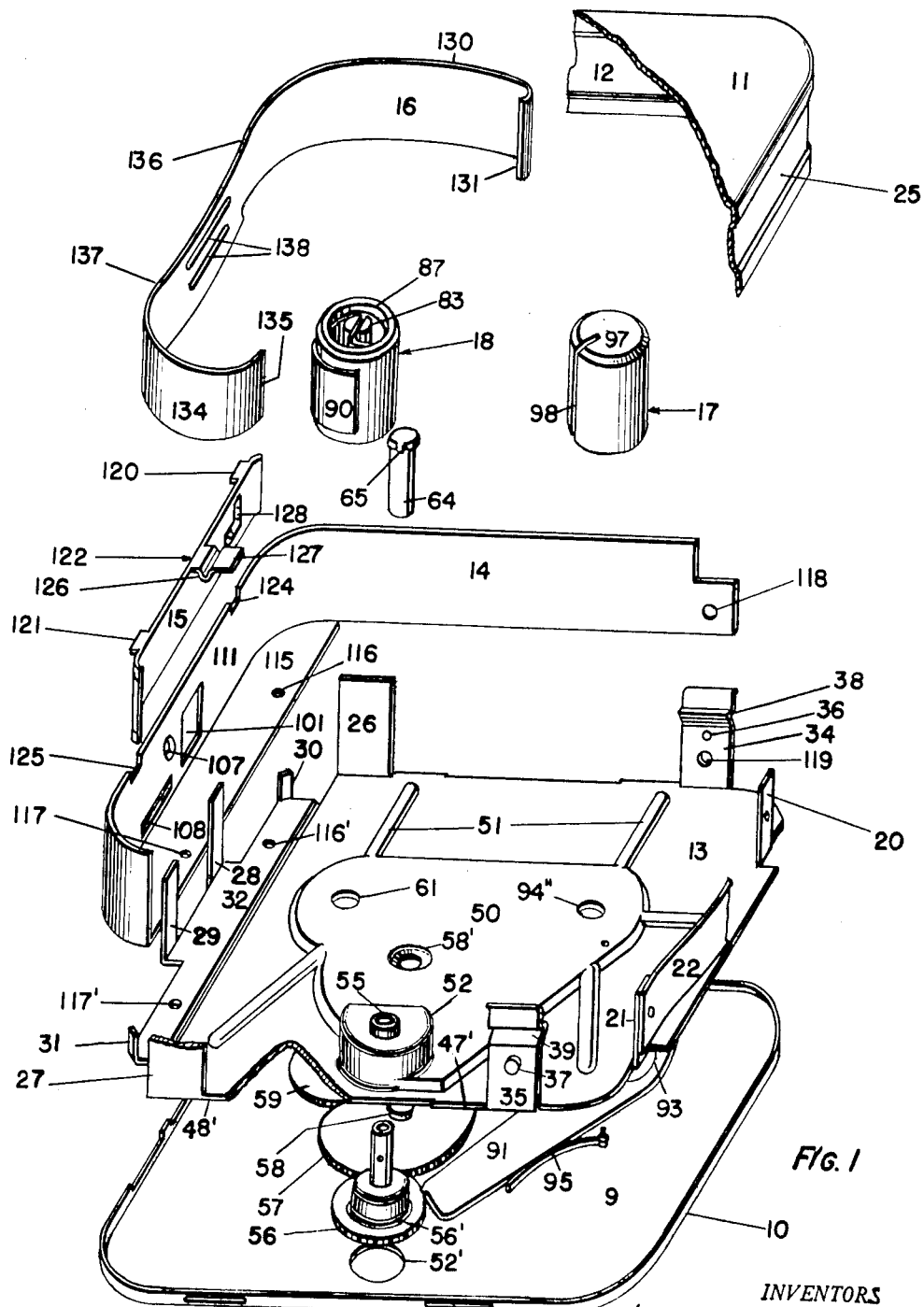
Figure 1 is an exploded isometric view of a magazine built according to a preferred form of our invention, certain parts being omitted for clarity.

This chassis plate also includes upturned front side posts 26 and 27 which with other formations later described support and stiffen the sides of both housings. Support at the rear and front and further support at the sides are furnished by other upturned formations later described. Front gate posts 28 and 29 struck upwardly from this plate serve as supports for resilient member 16. Smaller upstanding posts 30 and 31 like posts 28 and 29 extending upwardly from a front raised portion 32 of the chassis plate limit the inward movement of the tensioning portions of the multi-purposed spring. This central chassis also carries toward its rear edge two or more upstanding latching and reinforcing lugs 34 and 35 having delatching buttons 36 and 37 respectively and latching shoulders or projections 38 and 39. As explained and claimed in our parent application the latching function of lugs 34 and 35 prevents accidental or un-authorized opening of the housing outside of the plant of a manufacturer who furnishes the film. Depressions or beads 47 and 48 struck inwardly in one side wall of the lower housing or bottom plate 9 snap over small flat lips 47′ and 48′ which extend forwardly as viewed in Figure 1 from the side edges of the chassis and in its plane to assist in holding the two parts of the housing in position. Similar constructions not shown may be provided for the other side.

Figure 7:
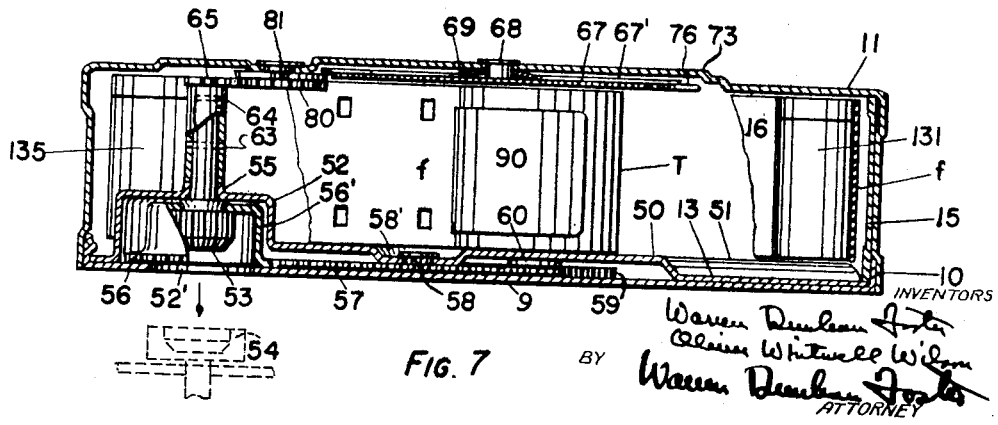
Figure 7 is an enlarged section on the line 7—7 of Figure 3 with certain parts broken away and particularly showing parts of a drive for a take-up and a meter which are alternatively blocked and unblocked according to our invention.

An embossing 50 is struck upwardly in this chassis plate to form an upper wall of a shallow housing which protects the film from gears and other moving parts. Strengthening ribs 51 radiate from this embossing. A higher protective embossing 52 surrounds the take-up drive of the magazine and is disposed directly above an opening 52' in the bottom of the magazine for the reception of a driving connection from the camera. These embossings also act as light traps. Thus all of the driving mechanism is disposed in this housing formed between the chassis and the bottom plate. As is best seen in Figure 7 gears for the take-up and a controlling or locking member for a take-up mass T and a delivery mass D are directly mounted upon the under side of the chassis plate and extend downwardly therefrom. With the exception of one compound gear for which a long bearing is provided these gears are so thin and light that the single bearing furnished by this one plate is ample. If desired the bearings may extend from the chassis through the bottom plate, with play allowed for the slight relative movement between chassis and bottom but such double mounting is generally unnecessary and detracts from the full advantages of our invention. For an alternative construction, preferred in some cases, see Figures 9, 10 and 11 hereof and our parent patent.

Drive for the take-up mass T is transmitted through the mechanism shown in Figures 1, 3, 4 and 7. According to an important feature of this invention this drive is automatically blocked, and with it both masses of the film, except when the film is being driven by the wanted operation of the apparatus. A main driving gear 53 for co-action with a driving gear 54 (Figure 7) upon the film-handling apparatus C is positioned upon the magazine, as previously stated, within a cup or depression 52, the sides of which as shown at 55 are bent upwardly to form a bearing. Gear 54 upon the apparatus is driven by a spring or other motor. Attached to or formed with and surrounding gear 53 is a spur gear 56 which is irregular in vertical cross section in that it includes a cup-shaped or bell-shaped upwardly extending portion 56' within which gear 53 is disposed. It is with this spur gear 56 that our blocking mechanism directly and positively co-acts. This spur gear engages and drives spur gear 57 which by a short shaft 58 is mounted in a suitable depression 58' of the embossing 50 of chassis 13. In turn gear 57 engages and drives a third gear 59 journaled upon a short shaft 60 likewise mounted in the chassis plate in an opening 61 in embossing 50 and in a manner which will be clear from a consideration of Figures 5 and 8 later described yieldingly drives the take-up mass.

Gear 53 also positively drives a footage recording or indicating device or meter as is best shown in Figures 2 and 7. Our locking mechanism also positively controls the operation of this meter. This gear is attached to or formed upon an upstanding shaft 62 which as by a pin 63 is attached to and revolves a tube 64 which is formed with or to which is attached a gear having a single tooth 65 which drives the meter. As is seen in Figure 2, an indicating portion of this meter consists essentially of a relatively large flat gear 67 journaled upon a headed pin 68. Together with a slightly offset resilient disc 69 (Figure 7) this pin forms a friction bearing for the indicating gear 67 so that it is maintained in the position to which it has been moved by the drive but can be reset. This pin is attached to and extends downwardly from an upwardly extending embossing 73 in the top or cover member within and close to the lower face of which this gear is revoluble.

Mounted on the top of this indicating gear is a card 67' with various figures or indicia indicating the length of film which has been or remains to be exposed in such position that as the gear revolves they are visible through a suitable colored protective window 75. This indicating gear is formed with a reset lug 76 which coacts with a starting projection or stop 77 and a finish stop 78 which are embossed as a part of or inserted in the embossing 73 on the top of the cover. Motion is transmitted to this indicating gear 67 by an intermediate compound spur gear 79 having a bottom face 80 which is driven by the single tooth 65 which engages and drives the indicating gear. By reason of the above construction it will be clearly seen that no problems of light trapping and re-setting are presented. It will be seen that except for the above mentioned indicating portions of our meter all operable parts of our magazine are mounted upon and bodily movable with our chassis plate. According to the form of our invention shown in Figures 37, 38 and 39 of our parent application even these parts are mounted upon this plate. Our lock is equally applicable to the above noted embodiment of our invention.

As a fresh film is inserted in the magazine a worker simply pushes re-set lug 76 back to contact the starting projection. Since the indicator is not spring pressed in the direction of its operative travel or the one contrary thereto it does not have to be held in place as the magazine is assembled. Other meters for use within a magazine which are spring pressed contrary to the direction in which they are driven must be held in their starting position as the magazine is assembled, as is a difficult task. Thus an efficient and simple footage recording device is provided.

It will be understood by those skilled in this art that our invention may be applied to any footage recording device other than the preferred meter by which it is illustrated.

Figure 5:
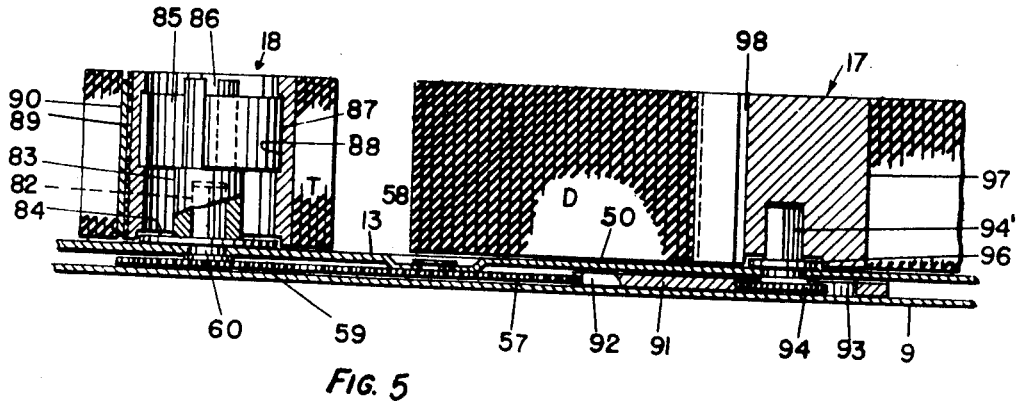
Figure 5 is an enlarged section taken on the irregular line 5—5 of Figure 6.
Figures 6, 8:
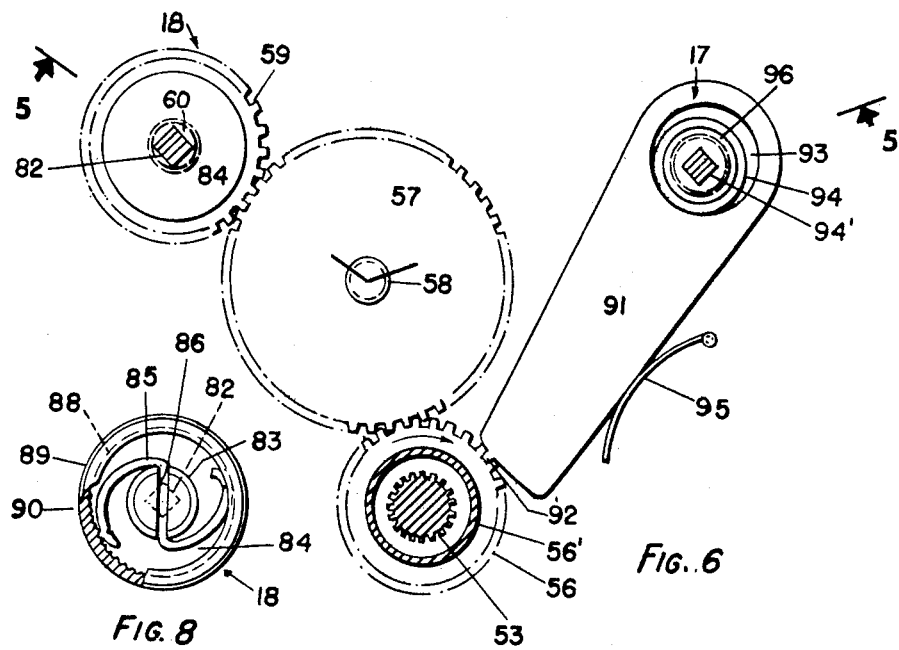
Figure 6 is an enlarged fragmentary top plan view of a drive for a take-up and our novel compound unidirectional clutch, blocking member and lock which is associated therewith.
Figure 8 is an enlarged horizontal section of an improved and novel take-up clutch or drive which is selectively locked and unlocked through the drive according to this invention.

As will be clearly seen by reference to Figures 5 and 8 we supply a simple and efficient take-up device, likewise under the control of our lock, generally indicated as 18, claims to which per se will be found in our parent patent. Shaft 60 upon which gear 59 revolves has a square support portion 82 which coacts with an appropriate squared opening in a take-up core 83. This core rests upon a bottom flange 84 which is attached to or formed as a part of post 82. To this core an irregularly or S-shaped leaf spring 85 is attached merely by being slipped within a vertical clip 86 in square portion 82. The edges 87 of this spring bear against a radial internal slot 88 formed in the upper portion of a take-up tube 89 upon which the film is wound and to which it is attached as by a clip 90. If desired this internal slot may be knurled or otherwise roughened to increase the frictional contact between the spring, which is driven directly by the power of the apparatus, and the take-up tube which supports and rotates the film. Assembly consists merely of compressing the outer portions of the spring slightly as the tube is slipped over. The slot holds the spring in place.

As explained in introductory portion of this specification we lock the entire drive and the delivery mass and its support when the magazine is not in use and to prevent the unwanted unwinding of the take-up mass and delivery mass. As will be seen by reference to enlarged Figure 6 a simple and effective device accomplishes this result. It consists essentially of a dog 91 having a single blocking tooth 92 formed in its lower and leftward end as viewed in that figure. This tooth coacts with the teeth of gear 56. The other end of the dog is formed with a circular opening 93 which surrounds but is larger than a detent or disc 94. A light leaf spring 95 tends to rotate the dog clockwise about the disc so as normally to bring the blocking tooth 92 of the dog into contact with the teeth of the gear. Preferably the coacting surfaces of the opening and disc associated with the delivery spindle are slightly roughened. This dog may be made of fiber. As clearly shown in Figure 5 disc 94 is extended through a bearing in embossing 50 to form a squared delivery spindle or post 94' upon which a collar 96 is forced adjacent the top of the embossing. This collar supports a delivery block 97 which is circular in horizontal cross section and embodies a vertical cut 98 into which the delivery end of the film is slipped. It will thus be seen that this actuating member of our locking device is mounted upon chassis plate 13 and movable therewith, both in the original assembly of our magazine and as the chassis plate and the film, together with its guiding and movement-conditioning members, slide slightly to position the film in the focal plane.

By reason of this construction it will be understood that except as gear 56 is revolved in a clockwise direction coaction of the tooth 92 of the dog and these teeth of the gear prevent all of the gears from moving in an unwinding direction and hence prevent the unwanted unwinding of the take-up mass. Similarly the edge of opening 93 is forced against the detent disc associated with the delivery spindle so that under these conditions spindle 94' and the delivery mass are blocked against movement in either direction. As a practical matter it will be understood there is no chance of the take-up mass moving in a taking up direction except when power is applied through the gears. When, however, gear 56 by the power of the apparatus is moved clockwise or in the direction of the arrow of Figure 6 dog 91 is rotated anti-clockwise against the light power of spring 11 and the structure is freed. Spring 95 is extremely light and consequently there is almost no drag upon the spring motor of a camera and no appreciable noise.

In order that our invention and the best manner of working it which we have discovered shall be understood we are describing in outline the gate and other elements including the tension control arms which make up the channel through which the film is fed from the delivery mass to the take-up mass. The application of our invention to a magazine prevents the blocking of this channel by the unwanted unwinding of the film and in addition prevents the unwanted lateral movement or chattering of the gate or a movable member thereof and consequently that of the film at its point of translation. Such unwanted unwinding interferes with the proper tension of the film (if the Bundick and Proctor system is used) or changes the size of the loop or destroys it (if the Thornton system is employed). For a full description of and claims to this channel and gate and improvements in cooperation therewith of the tension control system feeding reference is made to our co-pending parent application.

As previously stated the gate consists essentially of a fixed apertured gate plate and film guide generally indicated as 14, a presser member 15 and a multi-purposed relatively long spring 16.

This fixed guide 14 has an aperture 100 aligned with a similar aperture 101 in a front wall of the magazine and a lens 102 upon a camera C when the magazine is disposed in a magazine-receiving compartment 103 and held therein as by springs 104, the springs at the rear of this compartment tending to force the magazine forwardly against front wall 106 of this compartment. See Figure 3. In the form of the invention first shown a rigid lug 107 projects forwardly from and is integral with fixed gate plate 14. A pull down claw 109 (Figure 3) powered by the motor of the apparatus and admitted through suitable openings in the front of the magazine and the gate, moves the film between the delivery and the take-up masses. This plate 14 is formed with a right-angled positioning portion 115 offset, to the rear or to the right as viewed in the drawings, from the front surface 111. Openings 116 and 117 are aligned with openings 116' and 117' in the forwardly facing flange 32 of chassis member 13. To assemble this plate with the chassis the flange of the gate plate is merely slipped underneath this forwardly facing flange of the chassis and rivets or bolts may be introduced through openings 116—116' and 117—117'. This plate 14 may be further supported by a rivet or pin which is passed through an opening 118 in its rearward end and a cooperating opening 119 in locking and positioning lug 34 which extends upwardly from the chassis at right angles to its surface.

Presser member 15, which holds a film against this gate plate at its aperture and is positioned backwardly thereof, consists essentially of a main vertical portion suitably relieved which engages the side of the film opposite surface 111, two forwardly facing edge guiding lugs 120 and 121, and a backwardly extending, slightly resilient finger piece generally indicated as 122. See Figures 1, 3 and 4. These edge guiding lugs coact with openings 124 and 125 in the top surface of plate 14. This finger piece comprises a downwardly offset portion 126 serving as a finger hold and an extreme rearward portion 127 bent slightly upwardly. Upwardly inclined portion 127 bears against the under surface of cover member 11 when the magazine is assembled and presses or holds the presser plate and the film downwardly. This presser plate is completed by a resilient positioning finger 128 which as is common in the magazine art locks the film against rearward movement in the gate but readily permits its forward movement.

Multi-purposed spring 16 which resiliently holds this presser plate in position comprises a delivery tensioning arm 130 having a curved extremity 131, a take-up tensioning surface 134 having a curved extremity 135 and a central portion embodying portions 136 and 137 which are curved forwardly or to the left as shown in the drawings and when the gate is completely assembled bear against the upper and lower portions respectively of the presser member. Longitudinal ribs 138 tend to strengthen the spring at this point and give it added rigidity.

For a full discussion of the structure and operation of this exemplification of this system of feeding, reference is made to our said co-pending parent patent and other patents noted therein. For an understanding of the invention claimed herein, it is necessary to state only that these spring pressed tensioning and guiding arms condition the feeding of the film so that the portions thereof upon the delivery and take-up supports respectively move continuously but at rates of speed which vary regularly in step with the operation of the pull down, while the entire unwound stretch of the film is maintained under tension without unsupported loops with that section at the aperture of the gate or point of translation held motionless. The forces applied upon each side of the aperture are in balance.

It will be readily understood that if prior to the start or during a first phase of a feeding operation, the film is allowed to unwind due to its natural elasticity, jars or other causes, it may choke the feeding channel, supply an amount of slack greater or less than that which can be quickly absorbed by the operation of the spring pressed arms, with consequent possibility of a direct jerk against either the delivery mass or the section of the film held motionless at the gate. If the film is thus allowed to unwind before exposure or projection starts, it is likely that several "frames" or images will have to be fed before the smooth kinetic flow characteristic of this system of feeding becomes operative. In extreme cases of unwinding breakage has resulted.

If the Thornton system of unsupported loops of slack film is employed, the results of unwanted unwinding are disastrous. Any system depending upon loops demands the maintenance within very close limits of the length of slack film or the size of the loops. Although a skilled worker originally may properly set these loops by hand, any subsequent movement of a continuously rotating sprocket or sprockets intended to maintain these loops or of the film in relation to them except in synchronism with the operation of a pull-down results in loss of the loop generally with breakage of the film and always with an unsteady image.

We shall next illustrate our invention in an embodiment wherein our locking device is mounted upon a bottom plate or wall of a container together with film driving members. See Figures 9, 10 and 11. All film engaging elements are disposed upon a chassis member 521 and all film driving members and the lock upon a bottom plate 522. As shown this bottom plate has short upstanding flanges 549 but we emphasize that the magazine casing may be of the conventional type wherein the sides extend upwardly to a point above the top of the film and adjacent the cover. We may apply the invention claimed herein to container structures other than those shown and claimed in our parent Patent Number 2,560,564.

As will clearly be seen from Figure 9 this chassis plate has an upwardly off-set forward portion 523 parallel to the bottom plate or wall of the magazine with lugs 524 and 526 struck upwardly therefrom to hold in position a multi-purposed spring 527 having a delivery tensioning portion 528 and a take-up tensioning portion 529 as previously described. A fixed apertured gate member 530 includes a forwardly extending positioning lug 531 and an offset right angled mounting portion 532 extending rearwardly from the film engaging portion and as by rivets 536 and 537 fixedly attached to the chassis. A presser member 539 includes edge guides 540 and 541 and a combined finger piece and lateral positioning member 542. The multi-purposed spring forces the presser member against the film and the film against the apertured gate member which by means of the positioned lug is held closely in the focal plane of the lens of the camera. Further description of this gate structure is not necessary.

This chassis plate is mounted upon bottom member 522 either fixedly or preferably by a spring 454 which on one side engages lugs 546 and 547 struck upwardly from the chassis plate and on the other engages a rear rim 549 of the bottom of the magazine and a depending side 551 of top cover 550, as previously described in connection with Figure 3. Locking lugs 533 cooperating with protuberances 554 may hold the bottom and top housings together. A central portion of the chassis member is slightly offset upwardly and parallel to its main plane as indicated as 555 to form a housing for the lock and gears which are attached to the bottom plate.

These gears receive their power from gear 560 of a camera or other film handling apparatus. They include a main compound driving gear generally indicated as 561 which has a motion-receiving toothed portion 562 driven by said wear 560 of the camera and disposed or formed within another toothed portion 563, all as previously described. This structure is mounted in an inwardly or upwardly structure protuberance or bell 565 of the bottom plate 522 and revolves therein. A shaft 566 is attached to this gear structure and extends further upwardly and terminates in a one toothed gear 568 which drives a compound gear generally indicated as 569 having a driven portion 570 in the form of a spur gear and a driving portion 571 in the form of one tooth, this compound gear being revoluble upon a pin 572 which is attached to cover 550, all as is clearly shown in Figure 11. This one toothed gear in turn drives an indicating spur gear 575 attached to a plate 576 which carries figures indicating film footage used or remaining and is revoluble upon a pin 577 placed in the cover, the connection between the pin and the indicating gear including a slip construction so that the plate may be reset. In our parent application we describe a preferred construction of our invention wherein the indicating as well as all driving instrumentalities of the meter are carried either by a chassis plate or by a bottom member. The lock of this invention may be used with such construction also.

The driving or motion-transmitting portion of formation 563 of the compound gear engages and drives a spur gear 581 revoluble upon a pin 582 placed in the bottom plate 522. This gear in turn drives a spur gear 584 mounted upon a pin 585 fixed to the bottom plate 522. Through mechanism such as that previously described gear 584 through a slip clutch drives a take-up mass or roll of which only shaft 586 is shown in this figure. Since this construction may be the same as that previously described it need not be further explained. Shaft 586 corresponds to shaft 82 of Figures 5, 6 and 8.

We lock both the delivery and the take-up mass of the film except when a feeding operation is being carried on. A blocking plate 591 is closely similar to blocking plate 91 described in connection with Figures 3, 5 and 6.

Tooth 592 of this plate as previously described engages one of the teeth of gear 563 except when the powered revolution of that gear forces the blocking plate counter-clockwise as shown in Figure 10. An oversized opening 593 formed in the opposite end of this plate encircles an annulus 596 formed upon pin 597 and in the manner previously described prevents revolution of the delivery mass when the drive is at rest. When, however, gear 563 is revolved clockwise as will be seen in Figure 10 plate 591 is moved against the power of light spring 598 and thereupon the drive and the delivery and take-up masses are freed from restraint. It will thus be seen that our lock is disposed upon the bottom plate 522 between it and the chassis 521.

As will be best seen by reference to Figure 11 an inward extension or bell 600 of the bottom plate 522 surrounds compound gear 561 and an opening 601 formed in bottom plate 522 to admit the driving gear 560 of the camera. An upwardly extending shoulder 602 of formation 555 of the chassis plate has light trapping extensions 603 offset therefrom at right angles thereto which together with the bell form a barrier against light leakage. These extensions extend over the top and sides of the bell. It will be understood that pressure from spring 545, if it is used, tends to keep this formation in engagement with the bell 600 thus preventing fogging of the film within the magazine.

Our invention may readily be applied to that embodiment of our parent patent wherein all of the portions of a footage recording device are carried by either a chassis plate, as in the structure of Figures 37 and 38 of our parent patent, or by a bottom plate, as in the structure of Figure 39 thereof. In the former instances we prefer to mount our lock upon the chassis plate but do not need to do so.

Although our invention is particularly applicable to use with a magazine it may also be employed in a camera, projector or other film handling apparatus making use of open reels. For example, such a device is particularly valuable in continuous or repetitious projectors or those which are either pre-threaded or automatically threaded and carried from place to place.

From the above description of a plurality of embodiments of our invention it will be seen that in summary in a magazine or other film handling device or apparatus we provide a delivery support 17, normally freely revoluble, a take-up support 18 and a footage recording device 67 (et al.), positively operated by a source of power, which moves the film. A gear train drives and operates said take-up support and said footage recording device or meter. A branch including gears 56, 57 and 59 (or 563, 581 and 584) operates the take-up member and a branch including gears 65, 79, 81 and 67 operates the meter. A control dog 91 or 591 operatively interconnects said delivery member and said gear train, said dog including an oversized opening 93 or 593 surrounding a detent disc 96 or 596 attached to the delivery member and a tooth 92 or 592 formed in an external portion of said dog spaced from said opening and engageable with a tooth of gears 56 or 565 of said train for blocking it. This detent disc is smaller than the opening but engageable by its periphery when the dog is moved under the power of a spring 95 or 598. The relation of the external tooth of the dog to this opening is such that when the gear is revolved in a winding-up direction this tooth removes the dog from holding or blocking relation to the delivery member and the gear train but when the train is not so revolved the dog under the power of the spring moves said tooth and the periphery of the opening and the disc into such holding relation. It will be understood therefore that this mechanism positively locks the delivery member against unwanted unwinding and the gear train (and hence the take-up support) from all unwanted movement so that except when power is purposely applied to the train the footage recording device and film are both held locked against movement. Thus this operable blocking means or member or lock places the gear train and all members operated thereby and said delivery support alternatively in free-running and locked positions. Power is supplied to the train as illustrated by one of its gears or motion-receiving connections 53 or 562 which is disposed externally to the casing, if our invention is embodied in a magazine, these gears coacting with a gear or motion-transmitting connection 54 or 560. A pull-down claw 109 or P furnishes intermittent movement to the film between the delivery and take-up masses at the point of translation or aperture 101 or apertured gate member 530.

Throughout the foregoing specification we have made frequent reference to the ease of servicing a magazine, and a film mounted therein, constructed according to this invention and its parent. It will be readily understood that our provision of a lock, effective at all times except when a film is being regularly driven, is of great value in this connection, particularly since it prevents accidental and misleading movement of a footage recording instrument. By "servicing" we mean not only the removal of an exposed or projected film from a magazine and the substitution of a fresh film but also the necessary checking of the static and moving parts and whatever adjustment may be necessary. This servicing as applied to certain other magazines has proved difficult and expensive and has required the use of intricate gauges and dies and the services of skilled workmen. Among the major advantages of this invention in part flowing from our provision of a lock is that a magazine built according hereto when it comes in from the field may be prepared for effective use again with a minimum expenditure of time, trouble and skill.

A particular advantage of our invention is that we apply our lock directly to a hub or support upon which a delivery mass is mounted. This mass, ordinarily being unhampered by a gear train, before photography or projection begins is much more likely to unwind accidentally than is a take-up mass. Therefore, our lock positively applied to the delivery spindle is particularly valuable, as is its automatic removal from such operative relation when regular feeding starts.

Other advantages of our invention will have been made clear by the previous portion of this specification. They include the provision of a simple, inexpensive and efficient structure in which a film in a magazine or disposed upon an open reel is locked against unwanted movement prior or subsequent to a regular feeding operation thus minimizing risk of film jamming or breaking or improper exposure or projection due to lateral movement during a feeding operation. Other important advantages arise from positively locking a footage recording device except when the film is being regularly fed.

We claim:

1. In a film magazine, a revoluble take-up support, a revoluble delivery support, a gear train for driving said take-up support, means for blocking the revolution of said delivery support, means for blocking said gear train, and operable means operatively interconnecting said previously mentioned blocking means for operating both thereof.

2. In a film magazine, a delivery support, a take-up support, a drive for revolving said take-up support in a winding-up direction, and means within said magazine and operatively interconnected with said drive for blocking the revolution of said delivery support except when said take-up drive is revolving said take-up support in a winding-up direction.

3. In a film magazine, a delivery support, a take-up support, a drive for revolving said take-up support in a winding-up direction, and means within said magazine and operatively interconnected with said drive and both of said supports for blocking the revolution of said delivery support and the movement of said take-up support in a winding-up direction.

4. In a film magazine for use in a film handling apparatus having means for positioning a magazine therewithin and a powered drive, a revoluble delivery support, a revoluble take-up support; a gear train adapted to be operated by the drive of the apparatus when the magazine is positioned therewithin for driving said take-up support, and control means operatively interconnecting said gear train and said delivery support and containing instrumentalities for blocking the revolution of said delivery support and said gear train except when said magazine is positioned within said apparatus and said powered drive is operating said gear train.

5. In a film magazine, a driven member for moving a film, a revoluble drive for said member, a delivery support for the film so moved, a member engageable with said support for blocking the revolution thereof, and means operatively interconnected with said drive and operated by the revolution thereof for removing said blocking member from blocking relation to said delivery support when said drive operates said driven member.

6. In a film handling device, a take-up member, gear means for revolving said take-up member in a winding-up direction, a drive for said gear means, a delivery member normally freely revoluble, and blocking means comprising instrumentalities operatively interconnecting said delivery member and said gear means for disabling said gear means and preventing the revolution of said delivery member and including a connection with said gear means operated by the movement thereof which renders said blocking means inoperative when said gear means is driven in a winding-up direction.

7. In a film handling device, a revoluble take-up support, a revoluble delivery support, a gear train for driving said take-up support in a winding-up direction when power is applied thereto, and a single member operatively engageable with said gear train and with said delivery support for blocking revolution of said take-up support and said delivery support except when said gear train is operated by power in winding-up direction, said member including an instrumentality which renders it inoperable when power is applied to said gear train.

8. In a film handling device, a take-up member, a gear train for revolving said take-up member in a winding-up direction when power is applied thereto, a delivery member normally freely revoluble, and a control dog operatively inter-connecting said delivery member and said gear train, said dog including an over-sized opening surrounding said delivery member and a tooth spaced from said opening and formed in an external surface of said dog and engageable with a tooth of one of the gears of said train, a detent disc surrounding and attached to said delivery member, said disc being smaller than said opening but engageable by the periphery of said opening in said dog when said dog is moved, and a spring for moving said dog to maintain said periphery in engagement with said detent disc of said delivery member, the disposition of said external tooth upon said dog in relation to said opening being such that when said gear is revolved in a winding-up direction said dog removes said tooth from holding a relation to said delivery member but when said train is not so revolved said dog under the power of said spring moves said tooth into such holding relation.

9. In a film handling device, a take-up member, a gear train for revolving said take-up member in a winding-up direction when power is applied thereto, a delivery member normally freely revoluble, a control dog operatively interconnecting said delivery member and said gear train, said dog being formed with an over-sized opening surrounding said delivery member and a tooth engageable with one of the gears of said train, and a spring for moving said dog to hold said tooth in engagement with said gear, the disposition of said tooth upon said dog in relation to said opening and to the teeth of said gears being such that when said gear is revolved in a winding-up direction said dog is removed from holding relation to said delivery member and said gear but when said train is not so revolved said dog is placed in such holding relation and the revolution of said gear in a direction contrary to said winding-up direction is blocked and the revolution of said delivery member in any direction is blocked.

10. In a film magazine adapted for use with a film handling apparatus having a source of power, a magazine-receiving compartment, and a connection for transmitting motion from said source of power to said magazine when it is disposed in said compartment; said magazine having a motion-receiving connection adapted to coact with said motion-transmitting connection of said apparatus when said magazine is disposed in said compartment, a take-up member, a gear train including said motion-receiving connection for revolving said take-up member in a winding-up direction when power is applied thereto, a delivery member normally freely revoluble, a control dog operatively inter-connecting said delivery member and said gear train, said dog including an over-sized opening surrounding said delivery member for holding said delivery member against revolution when the periphery of said opening is forced against said member, said dog having a tooth engageable with a tooth of one of the gears of said train, and a spring for moving said dog to bring said tooth in engagement with said gear, the disposition of said tooth upon said dog in relation to said opening being such that when said gear is revolved in a winding-up direction said dog is removed from holding relation to said delivery member but when said train is not so revolved said dog under the power of said spring forces said periphery into such holding relation.

11. In a film magazine, a delivery support for a film, a take-up support for the film, a gear train for operating one of said supports in a feeding direction, and a blocking member extending between a gear of said train and last mentioned support which comprises a detent and operating formation engaging teeth of said gear and a detent and mounting formation engaging said last mentioned support for holding both said gear train and said last mentioned support against movement except when power is applied to said gear train and the film is fed in relation to said support.

12. In a film magazine, a delivery support, a take-up support, a footage recording device which indicates the amount of film which has been fed in relation to said support, a gear train for operating one of said supports and said device, and a movable blocking member extending between a gear of said train and said last mentioned support which comprises a detent and operating formation engaging said gear and movable for holding said gear train and hence said indicating device against movement except when power is applied said gear train to feed a film in relation to said support.

13. Apparatus according to claim 12, said member also including a formation mounted upon said last mentioned film support for holding said member in operative position relative to said gear at all times and for bearing against said last mentioned support to hold it against rotation when said member is moved to block said gear train.

14. In a film handling magazine adapted for use with a film handling apparatus having a source of power, a magazine-receiving compartment, and a connection for transmitting motion from said source of power to said magazine when it is disposed in said compartment; said magazine having a motion-receiving connection adapted to co-act with said motion-transmitting connection of said apparatus when said magazine is disposed in said compartment, a take-up member, a gear train including said motion-receiving connection for revolving said take-up member in a winding-up direction when power is applied thereto, a footage indicating device, said train including gears which positively operate said indicating device, a delivery member normally freely revoluble, and a control dog operatively inter-connecting said delivery member and said gear train, said dog including an over-sized opening surrounding said delivery member and a tooth spaced from said opening and formed in an external surface of said dog and engageable with a tooth of one of the gears of said train, a detent disc surrounding and attached to said delivery member, said disc being smaller than said opening but engageable by the periphery of the opening of said dog when said dog is moved, and a spring for moving said dog to maintain the periphery of said opening in holding engagement with said detent disc of said delivery member, the disposition of said tooth upon said dog in relation to said opening being such that when said gear is revolved in a winding-up direction said dog removes said tooth from holding relation to said delivery member but when said train is not so revolved said dog under the power of said spring moves said tooth into such holding relation.

15. In a film magazine, a delivery support for a film, said delivery support normally being freely revoluble, a take-up support for the film, the film passing from said delivery support to said take-up support, a device for indicating the length of film which has been passed between said supports, a gear train, gears of said train driving said take-up support and said length indicating device, means including a member engageable with one of the gears of said train for blocking the revolution of said gear train and including a member holding said delivery support against movement and hence holding said length indicating device and the film without movement, and operable means for releasing said blocking means whereby said gear train and hence said length indicating device may be operated and said delivery support freely revolved.

16. In a film magazine, a revoluble delivery support, a revoluble take-up support, a gear train for driving said take-up support, a footage indicating device, a positive operating connection between said gear train and said footage indicating device, means for blocking the revolution of said delivery support, means for blocking said gear train, and operable means interconnecting both of said blocking means for operating both thereof whereby said gear train and hence said footage indicating device cannot be operated independently of the revolution of said delivery support.

17. In a film handling device, a take-up member, a device for indicating the amount of film taken up by said member, a gear train, gears of said train revolving said take-up member in a winding-up direction when power is applied to said train, other gears of said train positively operating said indicating device, a delivery member normally freely revoluble, a control dog operatively interconnecting said delivery member and said gear train, said dog including an over-sized opening surrounding said delivery member and a tooth engageable with a tooth of one of the gears of said train, and a spring for moving said dog to bring said tooth in engagement with said gear, the disposition of said tooth upon said dog in relation to said opening being such that when said gear is revolved in a winding-up direction said dog removes said tooth from holding relation to said delivery member but when said train is not so revolved said dog under the power of said spring moves said tooth into such holding relation, whereby said indicating device is held locked except when said gear train is free to operate said take-up and said indicating device and said delivery member is free to revolve.

18. In a film handling device, a revoluble take-up support, a delivery support, said delivery support normally being freely revoluble by the traction of the film, an indicating device which indicates the length of film which has been fed from said delivery support to said take-up support, a gear train for driving said take-up support in a winding-up direction and for positively operating said indicating device when power is applied thereto, and a single member operatively engageable with a gear of said train and with said delivery support for blocking the revolution of said gear train and said delivery support except when said gear train is operated by power in winding-up direction, said member including an operating connection with said gear train which renders said blocking member inoperable when power is applied to said gear train, whereby both of said supports and said indicating device are positively locked except when power is being applied to move the film.

19. In a film handling device, a film support, said support normally being revoluble, a member for moving a film in relation to said film support, a drive for revolving said film moving member to feed film in relation to said film support, a device for indicating the amount of film which has been so fed, a positive connection between said drive and said indicating device for operating said indicating device by said drive, and blocking means operatively interconnecting said film support and said drive for disabling said drive and preventing the revolution of said film support, said blocking means including a connection with said drive operated by the movement thereof to render said blocking means inoperative when said drive is operated to feed the film, whereby said indicating device is positively locked against movement except when said film support is operable during the feeding of the film in relation thereto.

20. In a film handling apparatus, a delivery support for a film, a take-up support for the film, a pull-down for moving the film from said delivery support and advancing it toward said take-up support, a device for indicating the footage of film which has been fed between said supports, a source of power, a gear train for transmitting motion from said source, gears of said train driving said pull-down and said take-up support and said footage indicating device, means including a member engageable with one of the gears of said train for blocking the revolution of said gear train and hence holding said footage indicating device and the film without movement, and operable means for releasing said blocking means whereby said gear train and hence said footage indicating device may be operated, said blocking means thereby preventing the operation of said footage indicating device except when the film is being moved in a feeding operation.

References Cited in the file of this patent

UNITED STATES PATENTS

| | | |
|---|---|---|
| 1,583,656 | Chapman et al. | May 4, 1926 |
| 2,026,960 | Branch | Jan. 7, 1936 |
| 2,026,984 | Lyman | Jan. 7, 1936 |
| 2,039,697 | Wittel | May 5, 1936 |
| 2,224,899 | Collins | Dec. 17, 1940 |
| 2,282,044 | Fairbanks | May 5, 1942 |
| 2,282,051 | Helbing et al. | May 5, 1942 |
| 2,326,654 | Jagust | Aug. 10, 1943 |
| 2,360,294 | Wellman et al. | Oct. 10, 1944 |
| 2,362,019 | Moore | Nov. 7, 1944 |